(12) United States Patent
Kurokami et al.

(10) Patent No.: US 11,225,777 B2
(45) Date of Patent: Jan. 18, 2022

(54) WORK MACHINE

(71) Applicant: HITACHI CONSTRUCTION MACHINERY CO., LTD., Tokyo (JP)

(72) Inventors: Kazushige Kurokami, Namegata (JP); Hiroshi Sakamoto, Hitachi (JP); Shigeki Tokita, Tsuchiura (JP)

(73) Assignee: HITACHI CONSTRUCTION MACHINERY CO., LTD., Tokyo (JP)

( * ) Notice: Subject to any disclaimer, the term of this patent is extended or adjusted under 35 U.S.C. 154(b) by 218 days.

(21) Appl. No.: 16/486,915

(22) PCT Filed: Mar. 14, 2018

(86) PCT No.: PCT/JP2018/010084
§ 371 (c)(1),
(2) Date: Aug. 19, 2019

(87) PCT Pub. No.: WO2019/176036
PCT Pub. Date: Sep. 19, 2019

(65) Prior Publication Data
US 2020/0277757 A1  Sep. 3, 2020

(51) Int. Cl.
*E02F 9/26* (2006.01)
*B60Q 5/00* (2006.01)
(Continued)

(52) U.S. Cl.
CPC ............... *E02F 9/26* (2013.01); *B60Q 5/006* (2013.01); *E02F 9/24* (2013.01); *E02F 3/32* (2013.01)

(58) Field of Classification Search
CPC ....... E02F 3/32; E02F 9/24; E02F 9/26; E02F 9/261; E02F 9/262; E02F 9/264; B60Q 5/006
See application file for complete search history.

(56) References Cited

U.S. PATENT DOCUMENTS 9,333,915 B2 * 5/2016 Nakanishi ............... E02F 9/261
9,442,194 B2 * 9/2016 Kurihara ............... G01S 13/931
(Continued)

FOREIGN PATENT DOCUMENTS

CA       2980993 A1    11/2016
JP    2003-105807 A    4/2003
(Continued)

OTHER PUBLICATIONS

Korean Office Action received in corresponding Korean Application No. 10-2019-7024293 dated Oct. 5, 2020.
(Continued)

*Primary Examiner* — Tyler J Lee
(74) *Attorney, Agent, or Firm* — Mattingly & Malur, PC

(57) ABSTRACT

A mode selecting device configured to select a work mode of a hydraulic excavator, a work determining section configured to determine whether work contents of the hydraulic excavator are work contents other than those of the selected work mode on the basis of a detection result of pilot pressure sensors, a minimum alarm region determining section configured to determine one of a plurality of minimum alarm regions preset on the periphery of the hydraulic excavator on the basis of a selection result of the mode selecting device and a determination result of the work determining section, and an alarm determining section configured to output an alarm signal to a buzzer when the relative position of an obstacle, the relative position being computed by an obstacle position calculating section, is inside an alarm region set so as to include the minimum alarm region determined by the minimum alarm region determining section.

4 Claims, 13 Drawing Sheets

(51) Int. Cl.
*E02F 9/24* (2006.01)
*E02F 3/32* (2006.01)

(56) References Cited

U.S. PATENT DOCUMENTS

| | | | | |
|---|---|---|---|---|
| 9,556,583 | B2* | 1/2017 | Guo | E02F 9/2025 |
| 10,508,417 | B2* | 12/2019 | Hasegawa | G06T 11/00 |
| 10,570,587 | B2* | 2/2020 | Kurokami | G06K 9/00228 |
| 2013/0088593 | A1* | 4/2013 | Ishimoto | E02F 9/24 |
| | | | | 348/143 |
| 2013/0141581 | A1* | 6/2013 | Mitsuta | H04N 7/002 |
| | | | | 348/148 |
| 2013/0147958 | A1* | 6/2013 | Mitsuta | B60K 35/00 |
| | | | | 348/148 |
| 2013/0162830 | A1* | 6/2013 | Mitsuta | B60R 1/00 |
| | | | | 348/148 |
| 2013/0182066 | A1* | 7/2013 | Ishimoto | E02F 9/261 |
| | | | | 348/38 |
| 2015/0183370 | A1* | 7/2015 | Nakanishi | B60R 1/00 |
| | | | | 348/148 |

FOREIGN PATENT DOCUMENTS

| | | |
|---|---|---|
| JP | 2006-257724 A | 9/2006 |
| JP | 2010-198519 A | 9/2010 |
| JP | 2014-215039 A | 11/2014 |
| JP | 2016-211149 A | 12/2016 |
| WO | 2011/158955 A1 | 12/2011 |
| WO | 2012/053105 A1 | 4/2012 |
| WO | 2016/174754 A1 | 1/2016 |

OTHER PUBLICATIONS

International Search Report of CT/JP2018/010084 dated Apr. 24, 2018.
International Preliminary Report on Patentability received in corresponding International Application No. PCT/JP2018/010084 dated Sep. 24, 2020.

* cited by examiner

WORK MACHINE

TECHNICAL FIELD

The present invention relates to a work machine.

BACKGROUND ART

Some work machines such as hydraulic excavators or the like include a periphery monitoring system that detects an obstacle such as a person, an object, or the like present on the periphery of the work machine, and alarms an operator of the work machine about the presence of the obstacle or performs control of limiting operation of the work machine according to a result of the detection in order to prevent a contact accident. However, at actual work sites, there are many cases of intentionally operating the work machine while knowing that a worker is performing work in the vicinity of the work machine. Under such an environment, even though the presence of the worker in the vicinity is known, the periphery monitoring system gives an alarm about the presence of the worker in the vicinity or limits operation of the work machine.

As one of devices attempting to solve such a problem, there is a device disclosed in Patent Document 1, for example. When work vehicle stop control is performed at a time of detecting an intruding object such as a worker or the like within an intrusion prohibiting region set on the periphery of a work vehicle, the device allows the intrusion prohibiting region to be set according to work contents of the intruding object, thereby suppressing intervention of unnecessary stop control and thus achieving prevention of a decrease in work efficiency.

PRIOR ART DOCUMENT

Patent Document

Patent Document 1: JP-2003-105807-A

SUMMARY OF THE INVENTION

Problems to be Solved by the Invention

However, in the above-described conventional technology, although the intrusion prohibiting region can be set according to the work contents of the intruding object, the operator needs to set the entry prohibiting region each time the work of the work machine is changed. Thus, in conditions in which work is changed frequently, a work load on the operator is increased. Such an increase in the work load on the operator is considered to invite a decrease in work efficiency.

In addition, because the trouble of an operation of setting the intrusion prohibiting region occurs with the increase in the work load on the operator, there is a possibility that an originally assumed operation may not be performed, as in a case of forgetting to set the intrusion prohibiting region or operating the work machine while fixing the intrusion prohibiting region even when the work of the work machine is changed. Under such unexpected operation, suppression of unnecessary alarming or unnecessary limitation of operation of the work machine is not performed sufficiently, and consequently a decrease in work efficiency may be invited.

The present invention has been made in view of the above, and it is an object of the present invention to provide a work machine that suppresses an increase in a burden on the operator, and can thereby suppress a decrease in work efficiency while performing appropriate control without an excess or an insufficiency with regard to an obstacle present on the periphery of the work machine.

Means for Solving the Problems

The present application includes a plurality of means for solving the above-described problems. To cite an example of the means, there is a work machine including: a vehicle main body; a work device attached to the vehicle main body; an operation signal sensor configured to detect an operation signal for driving the work device; a control system including an obstacle position calculating section configured to detect an obstacle present on a periphery of the work machine having the vehicle main body and the work device, and compute a relative position of the detected obstacle relative to the work machine; and a work mode selecting device configured to select a work mode of the work machine; the control system including a work determining section configured to determine whether work of work contents different from work contents of the work mode selected by the work mode selecting device is performed as work contents of the work machine on a basis of a detection result of the operation signal sensor, a minimum alarm region determining section configured to select one of a plurality of minimum alarm regions preset on the periphery of the work machine on a basis of a selection result of the work mode selecting device and a determination result of the work determining section, and an alarm determining section configured to output an alarm signal to an alarming device when the relative position of the obstacle relative to the work machine, the relative position being computed by the obstacle position calculating section, is inside an alarm region set so as to include the minimum alarm region determined by the minimum alarm region determining section.

Advantages of the Invention

According to the present invention, an increase in a burden on an operator is suppressed, and thereby a decrease in work efficiency can be suppressed while appropriate control is performed without an excess or an insufficiency with regard to an obstacle present on the periphery of the work machine.

MODE FOR CARRYING OUT THE INVENTION

An embodiment of the present invention will hereinafter be described with reference to the drawings.

Figure 1:
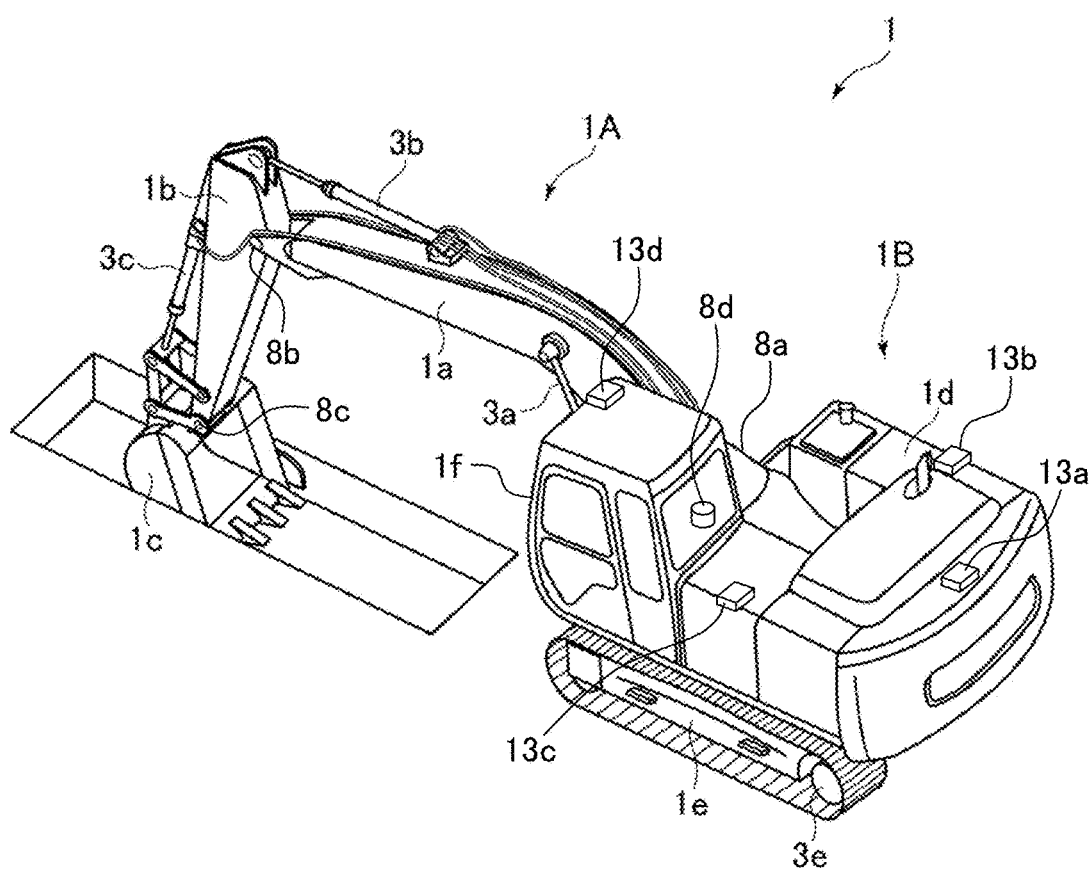
FIG. 1 is a diagram schematically depicting a configuration of a hydraulic excavator as an example of a work machine according to one embodiment of the present invention.

FIG. 1 is a diagram schematically depicting a configuration of a hydraulic excavator as an example of a work machine according to one embodiment of the present invention.

In FIG. 1, a hydraulic excavator 1 as a work machine includes: a crawler type lower track structure 1e; and an upper swing structure 1d swingably attached to an upper part of the lower track structure 1e and constituting a vehicle main body 1B of the work machine together with the lower track structure 1e. The lower track structure 1e is driven by a left and right travelling hydraulic motors 3e (only one of the left and right travelling hydraulic motors is depicted in FIG. 1). The upper swing structure 1d is driven by a torque generated by a swing hydraulic motor (not depicted), and is swung in a left-right direction.

A cab 1f is installed on the upper swing structure 1d. An articulated front work device 1A (work device) that performs work of forming a target shape of a land or the like is attached to a side of the cab 1f in the front of the upper swing structure 1d.

The front work device 1A (work device) is formed by coupling a boom 1a, an arm 1b, and a bucket 1c that each rotate in a vertical direction to each other. The boom 1a, the arm 1b, and the bucket 1c are respectively driven by a boom cylinder 3a, an arm cylinder 3b, and a bucket cylinder 3c. The boom 1a, the arm 1b, the bucket 1c, and the upper swing structure 1d are provided with angle sensors 8a, 8b, 8c, and 8d (posture information obtaining devices) that detect relative angles as respective posture information. Incidentally, IMUs (Inertial Measurement Units) that measure angular velocity and acceleration may be used in place of the angle sensors 8a, 8b, 8c, and 8d, and the relative angles may be obtained from measured values of the IMUs.

Arranged in the cab 1f are: an operation lever (not depicted) for generating operation signals (pilot pressures in a case of a hydraulic drive system) for driving the boom cylinder 3a, the arm cylinder 3b, the bucket cylinder 3c, the travelling hydraulic motors 3e, and the swing hydraulic motor (not depicted) according to operation directions and operation amounts, and operating the boom 1a, the arm 1b, and the bucket 1c, the upper swing structure 1d, and the lower track structure 1e by the operation signals; a touch panel monitor 15a (see following FIG. 2) for displaying information to an operator and allowing various kinds of settings (input) to be made by the operator; a mode selecting device 16a (see following FIG. 2) for selecting and changing a work mode; a buzzer 15b (alarming device: see following FIG. 2) for alarming the operator about an obstacle detected on the periphery of the hydraulic excavator; and an information processing controller 200 (see following FIG. 2) as a control system that controls operation of the whole of the hydraulic excavator 1. The operation lever is provided with pilot pressure sensors 9a, 9b, 9c, and 9d (operation signal sensors) for detecting operation signals (pilot pressures in this case) output from the operation lever by the operator. Incidentally, the mode selecting device 16a may be configured by a switch provided within the cab 1f or the like, and may be configured such that a function of the mode selecting device 16a is implemented by selecting a work mode via input to the touch panel monitor 15a.

Installed in the rear, on the right side and left side, and in the front of the upper swing structure 1d are, respectively, stereo cameras 13a, 13b, 13c, and 13d for photographing moving images in respective directions.

Figure 2:
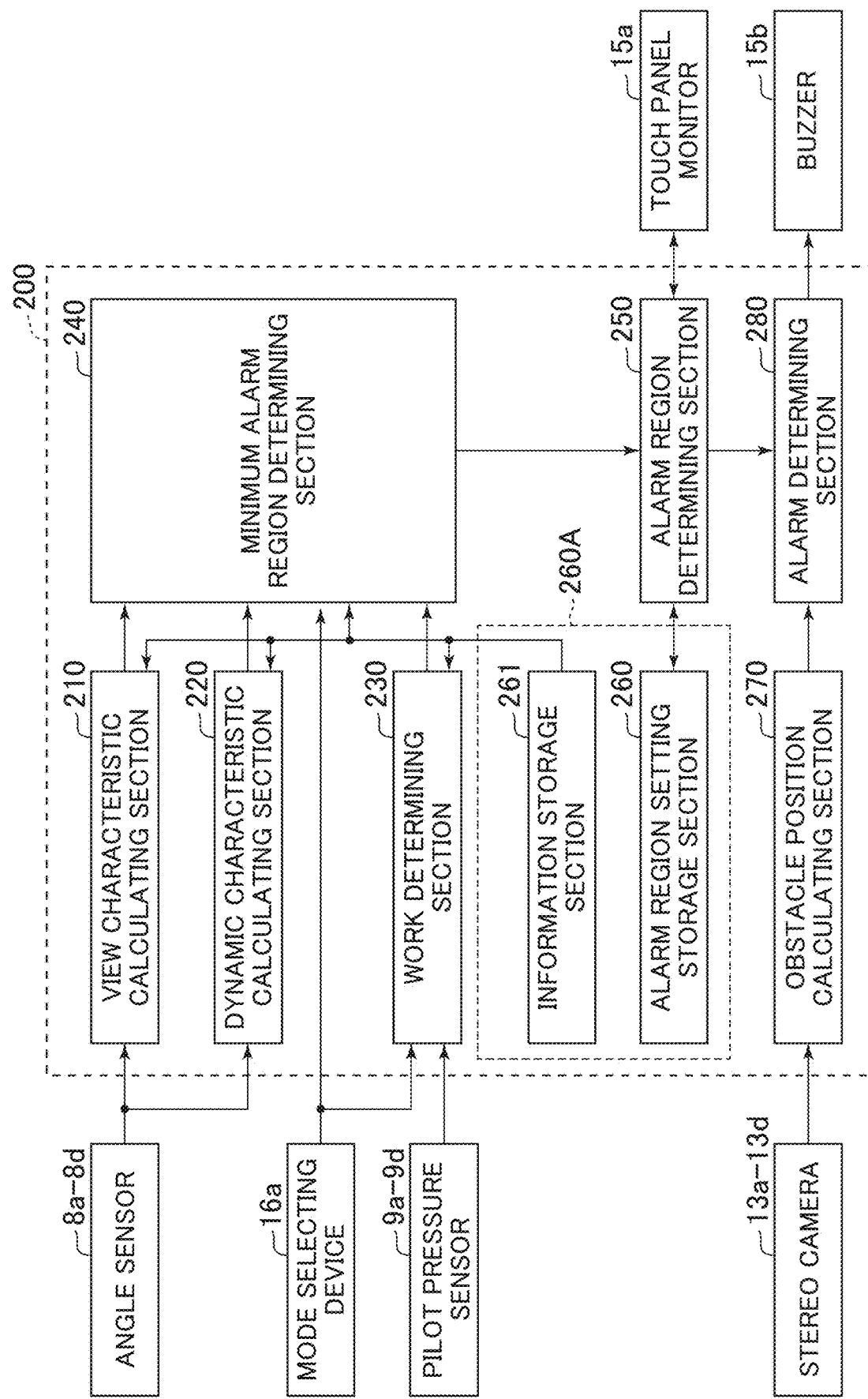
FIG. 2 is a functional block diagram depicting a part of processing functions of a periphery monitoring system in the hydraulic excavator together with related configurations.

FIG. 2 is a functional block diagram depicting a part of processing functions of a periphery monitoring system in the hydraulic excavator together with related configurations.

In FIG. 2, the periphery monitoring system is implemented in the information processing controller 200. The information processing controller 200 is connected to devices of the hydraulic excavator 1. The information processing controller 200 repeats processing operation in fixed cycles.

The information processing controller 200 includes, as processing functions of the periphery monitoring system, a view characteristic calculating section 210, a dynamic characteristic calculating section 220, a work determining section 230, a minimum alarm region determining section 240, an alarm region determining section 250, a storage section 260A, an obstacle position calculating section 270, and an alarm determining section 280. When an obstacle such as a worker or the like is detected inside an alarm region set on the periphery of the hydraulic excavator 1, the information processing controller 200 alarms the operator about the approaching of the obstacle by outputting an alarm signal to the alarming device (for example, the buzzer 15b).

The view characteristic calculating section 210 calculates regions (a direct view region and an indirect view region) that the operator can visually recognize from the cab 1f on the periphery of the hydraulic excavator 1 according to the posture of the front work device 1A (the boom 1a, the arm 1b, and the bucket 1c). As depicted in FIG. 1, the hydraulic excavator 1 illustrated as an example of the work machine in the present embodiment has the front work device 1A disposed to the right front of the cab 1f. Thus, the regions that the operator can visually recognize from the cab 1f change according to the posture of the front work device 1A. Therefore, the posture of the front work device 1A needs to be considered to obtain view characteristics in the hydraulic excavator 1.

Figure 3:
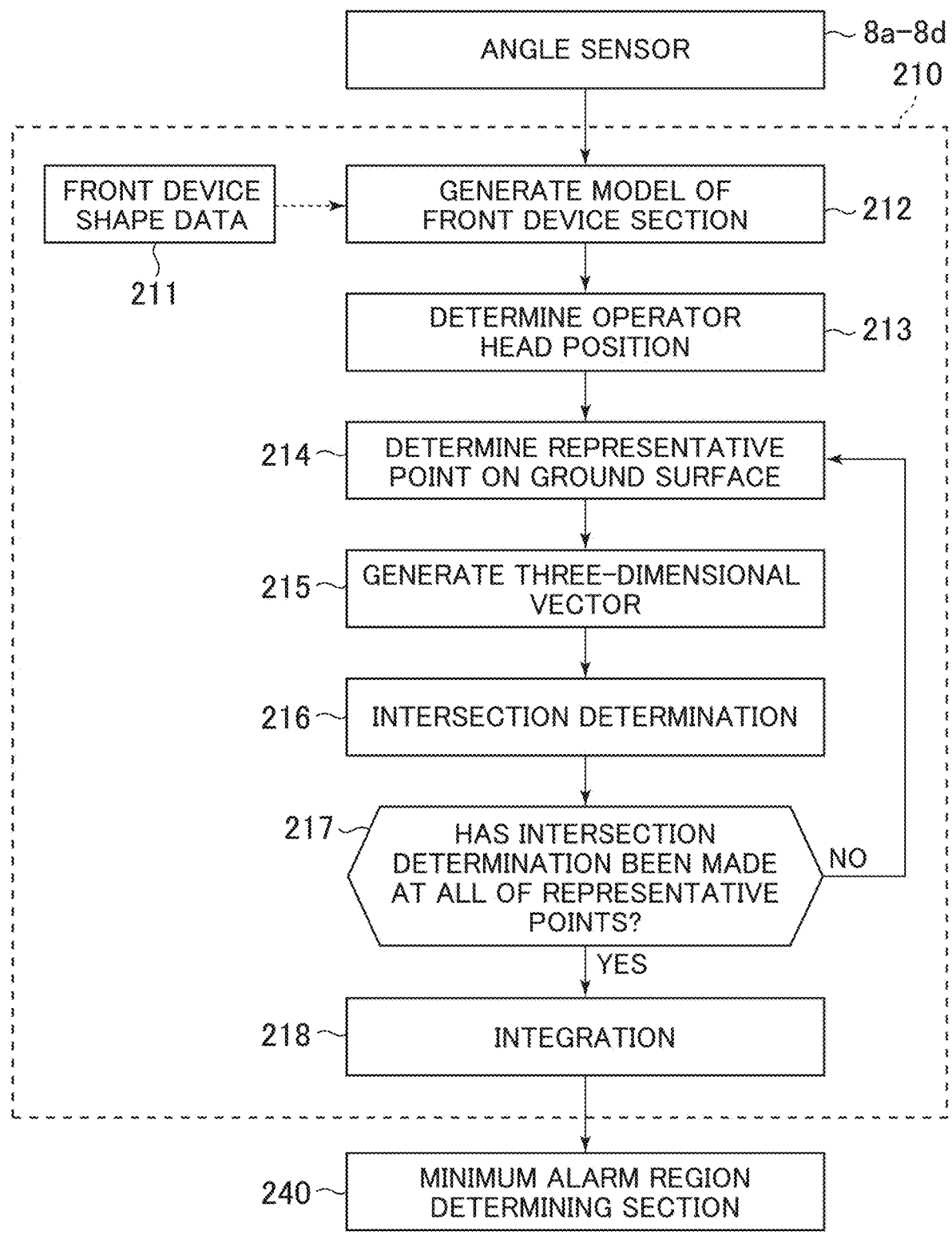
FIG. 3 is a diagram depicting a flow of processing of a view characteristic calculating section.

FIG. 3 is a diagram depicting a flow of processing of the view characteristic calculating section.

In FIG. 3, the view characteristic calculating section 210 first generates a model of the front work device 1A for calculation, the model having information on the respective positions and sizes of the boom 1a, the arm 1b, and the bucket 1c in a machine body coordinate system (coordinate system set to the upper swing structure 1d) on the basis of a detection result (output value) from the angle sensors 8a to 8c and front device shape data 211 of the front work device 1A (the boom 1a, the arm 1b, and the bucket 1c), the front device shape data 211 being stored in advance in an information storage section 261 of the storage section 260A (step 212). Next, the head position of the operator at a time of operation by the operation lever device of the hydraulic excavator 1 is determined by a predetermined calculating method (for example, a standard position set by ISO) (step 213). An arbitrary representative point is determined on a ground surface with the head position of the operator as an origin (step 214). A three-dimensional vector (line-of-sight vector of the operator) directed to the determined representative point is set (step 215). Here, whether the operator in the cab 1f can visually recognize the representative point in a right front region (that is, a region in the direction of the front work device 1A) is determined by performing intersection determination with the model of the front work device 1A (step 216). Here, the processing of steps 214 to 216 is repeated until the processing of steps 214 to 216 is performed for all of representative points on the ground surface (step 217). When the processing of steps 214 to 216 is ended for all of the representative points, view characteristic data as information regarding the view of the operator such as a blind spot region for the operator from the cab 1f outside the hydraulic excavator 1 and the like is determined by integrating obtained results (step 218). The view characteristic data calculated by the view characteristic calculating section 210 is output to the minimum alarm region determining section 240.

Incidentally, the method of computing the head position of the operator is not particularly limited to the above-described method. It is also possible to perform highly accurate head position computation by using some measuring means, and make more accurate visual recognition determination.

Figure 4:
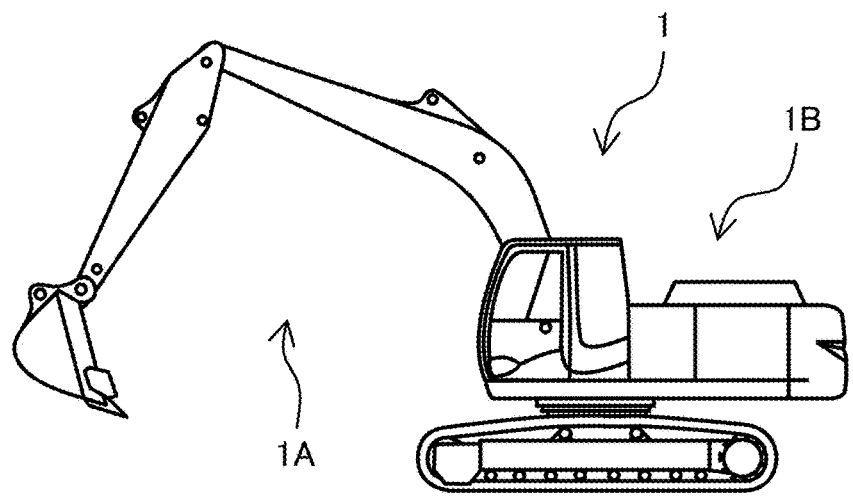
FIG. 4 is a side view depicting an example of a posture at a time of work of the hydraulic excavator.
Figure 5:
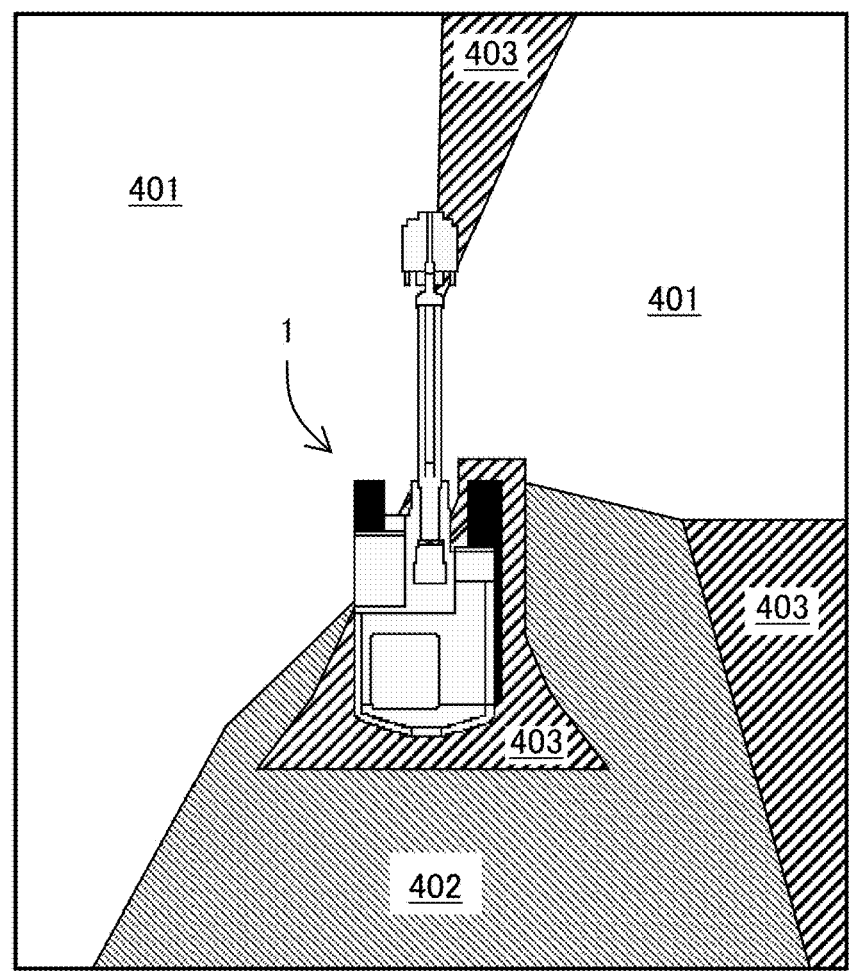
FIG. 5 is a diagram depicting an example of a direct view region, an indirect view region, and a blind spot region on the periphery of the hydraulic excavator in the posture of FIG. 4.

In addition, the view characteristics of regions not affected by the posture of the front work device 1A are stored in advance. Together with the view characteristic data computed by the processing of the view characteristic calculating section 210, the view characteristics are classified into three kinds of regions, that is, a direct view region that can be visually recognized by direct viewing of the operator, an indirect view region that can be visually recognized by a mirror or a monitor (that is, imaging by the stereo cameras 13a to 13d), and a blind spot region that cannot be visually recognized. The three kinds of regions are output as point group data indicating the respective regions to the minimum alarm region determining section 240. Incidentally, FIG. 4 depicts an example of a posture at a time of work by the hydraulic excavator 1, and FIG. 5 depicts an example of a direct view region 401, an indirect view region 402, and a blind spot region 403 on the periphery of the hydraulic excavator 1 in the posture of FIG. 4.

The dynamic characteristic calculating section 220 computes a shortest collision predicted time. The shortest collision predicted time is obtained by predicting a shortest time taken by at least a part of the hydraulic excavator 1 to reach each region on the periphery of the hydraulic excavator 1. The shortest collision predicted time is a time taken to reach the target region when the hydraulic excavator 1 operates at a maximum speed and in a shortest path from the posture at a time point in question.

Figure 6:
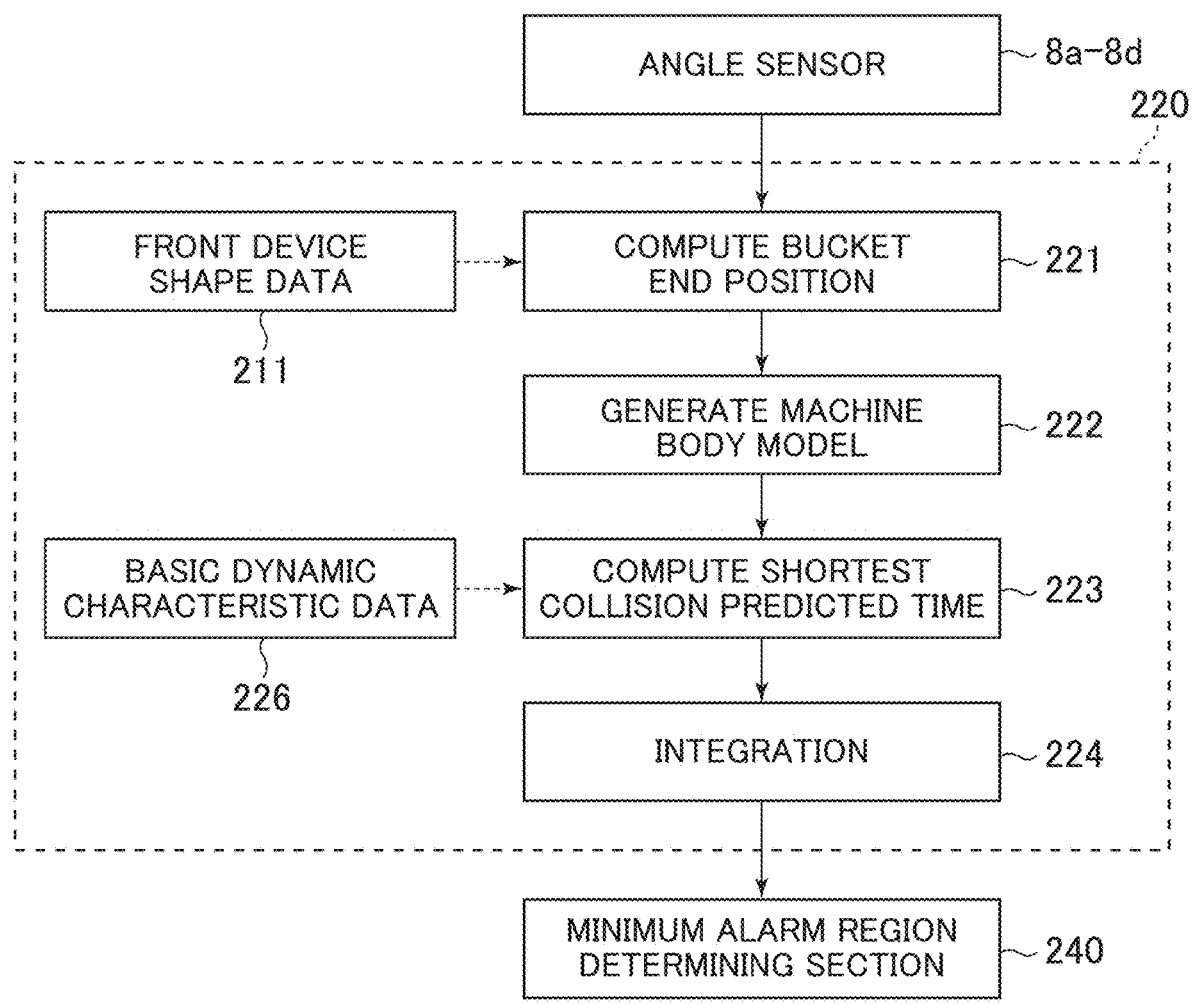
FIG. 6 is a diagram depicting a flow of processing of a dynamic characteristic calculating section.

FIG. 6 is a diagram depicting a flow of processing of the dynamic characteristic calculating section.

In FIG. 6, the dynamic characteristic calculating section 220 first computes an end position of the bucket 1c in the machine body coordinate system on the basis of the detection result (output value) from the angle sensors 8a to 8c and the front device shape data 211 of the front work device 1A (the boom 1a, the arm 1b, and the bucket 1c), the front device shape data 211 being stored in the information storage section 261 of the storage section 260A in advance (step 221). Next, a model machine body model of the whole of the hydraulic excavator 1 including the front work device 1A and the vehicle main body 1B is generated on the basis of the end position of the bucket 1c which is obtained in step 221 (hereinafter, referred to as a bucket end position) (step 222). Next, the shortest collision predicted time when the present bucket end position is set as an initial position is computed by using basic characteristic data 226 stored in the information storage section 261 of the storage section 260A in advance (step 223). Basic dynamic characteristic data 505 stores, for example, a maximum operation speed (a maximum swing angular velocity, a maximum travelling speed, and the like) as basic dynamic characteristics of each actuator. The shortest collision predicted time is computed on the basis of a maximum speed when the boom cylinder 3a, the arm cylinder 3b, the bucket cylinder 3c, a swing motor (not depicted), and the left and right travelling hydraulic motors 3e (only one of the left and right travelling hydraulic motors 3e is depicted) are actuated singly in respective operation directions. Incidentally, in actuality, the dynamic characteristics of the respective actuators change according to an initial posture of the front work device 1A, the temperature of a hydraulic operating oil, and the presence or absence of composite operation. Here, however, a case is assumed in which each actuator operates at a maximum operation speed. Next, dynamic characteristic data is generated by integrating computation results in step 223 (step 224). The dynamic characteristic data generated by the dynamic characteristic calculating section 220 is output to the minimum alarm region determining section 240.

The work determining section 230 determines whether work assumed in a work mode selected for the hydraulic excavator 1 is performed, or in other words, whether work of work contents different from work contents of the work mode selected by the mode selecting device 16a is performed.

Figure 7:
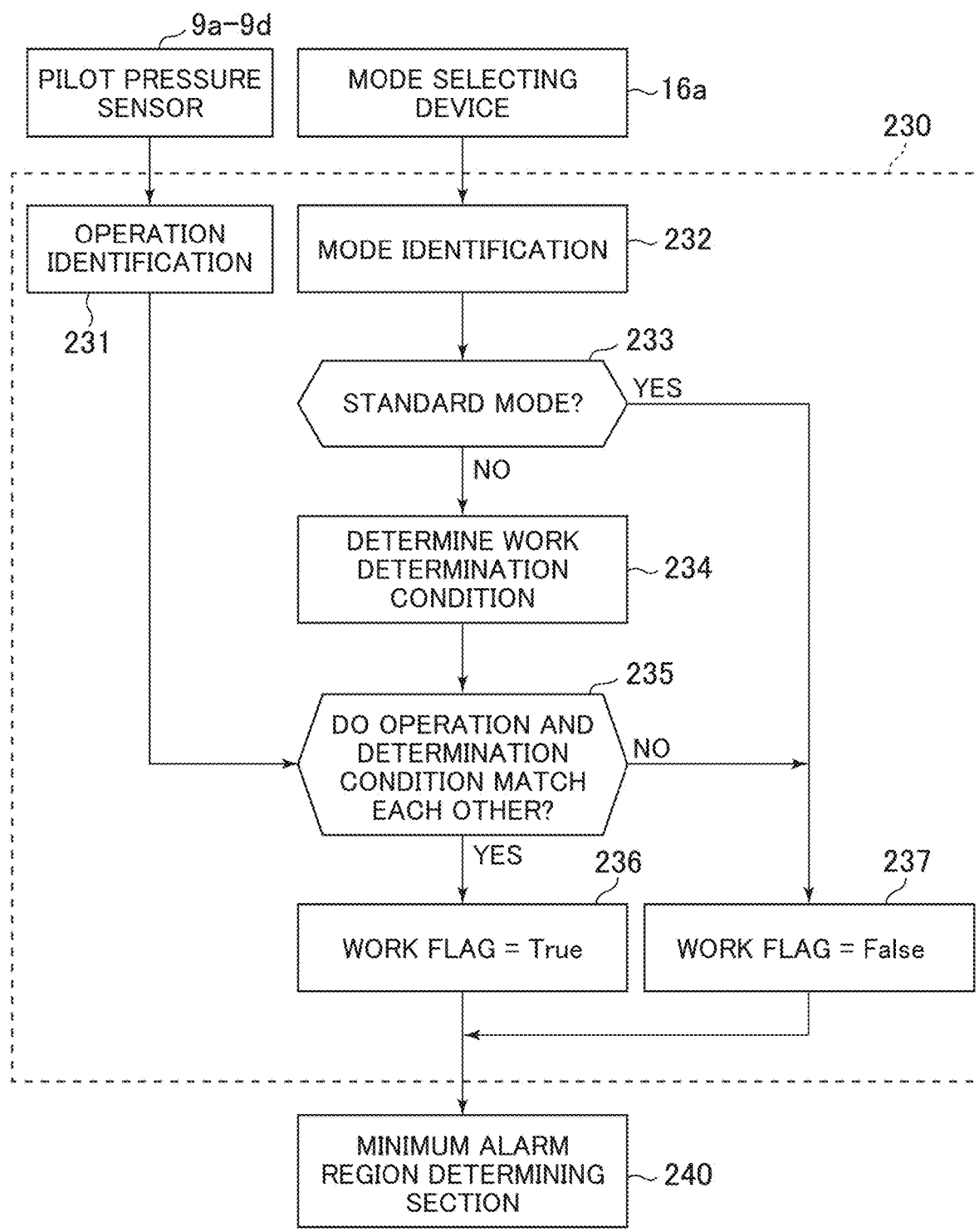
FIG. 7 is a diagram depicting a flow of processing of a work determining section.

FIG. 7 is a diagram depicting a flow of processing of the work determining section.

In FIG. 7, the work determining section 230 first identifies the work mode currently selected by the mode selecting device 16a (step 232), and determines whether the currently selected work mode is a standard mode (step 233).

In the following, description will be made of three work modes, that is, the standard mode, a MG mode, and a soil volume measuring mode defined in the present embodiment.

The standard mode is a work mode in a case where basic work is performed. The standard mode is selected when normal excavation and soil discharging work, travelling operation, and the like are performed. Operations of the hydraulic excavator 1 can be broadly classified into five operations, that is, a boom operation, an arm operation, a bucket operation, a swing operation, and a travelling operation. In the standard mode, various movements are expected to be required according to work contents with excavation and soil discharging and travelling as bases, and there is thus a possibility of any of the above-described five operations being performed.

The MG mode (machine guidance mode) is a work mode selected mainly in a case where leveling work is performed. In the MG mode, information on relative positions of the ground surface as a target and the end of the bucket 1c is displayed on a display device such as the touch panel monitor 15a installed within the cab 1f, or the like. The operator performs operation so as to align the end position of the bucket 1c with the target surface on the basis of the information displayed on the display device (for example, the touch panel monitor 15a), and can thereby position the bucket 1c more easily than performing operation while directly viewing the end of the bucket 1c. Incidentally, because leveling work is mainly performed in the MG mode, a boom operation, an arm operation, and a bucket operation are mainly performed as operations of the hydraulic excavator 1, and frequencies and operation amounts of operations such as a swing operation, a travelling operation, and the like are both expected to be low.

The soil volume measuring mode is a mode for measuring the weight of excavated soil. In the soil volume measuring mode, the operator performs work while checking a loading amount displayed on the monitor so as not to cause overloading when loading an excavated soil onto a dump truck, for example. In the soil volume measuring mode, excavation and loading work is mainly performed, and therefore, a boom operation, an arm operation, a bucket operation, and a swing operation are expected to be mainly performed.

Incidentally, a state in which work of work contents different from the work contents of the selected work mode is performed can also be considered to be a state in which a work mode other than the three work modes to be selected by the mode selecting device 16a is selected. Hence, this state can also be considered to be one of the work modes.

When a result of the determination in step 233 is NO, that is, when the currently set work mode is other than the standard mode, a determination condition is determined according to the present work mode, the determination condition being for determining whether present operation of the hydraulic excavator 1 is other than operation to be performed as the currently set work mode (for example the MG mode or the soil volume measuring mode), that is, whether work of work contents different from the work contents of the selected work mode is performed (step 234).

The determination condition used in step 234 is set in advance for each kind of work mode, and is stored in the information storage section 261 of the storage section 260A. For example, as for the MG mode, a state in which travelling and swing operation is continued for a fixed time or more is set as the determination condition, and as for the soil volume measuring mode, a case in which a travelling operation is performed or a swing operation is not performed for a fixed time or more, or the like is set as the determination condition.

In parallel with the identification of the work mode in step 232, the work determining section 230 identifies an operation on the basis of a detection result (output value) of the pilot pressure sensors 9a to 9d (step 231). In the hydraulic excavator 1, pilot pressures are changed (that is, operation signals are generated) by the operator by operating the operation lever device, to control flow rates of oil driving the respective actuators of the boom cylinder 3a, the arm cylinder 3b, the bucket cylinder 3c, the swing motor (not depicted), and the left and right travelling hydraulic motors 3e (only one of the left and right travelling hydraulic motors 3e is depicted). Thus, machine operation contents can be identified from the pilot pressures (operation signals). In the present embodiment, as described earlier, five operations, that is, a boom operation, an arm operation, a bucket operation, a swing operation, and a travelling operation are classified and defined as an example of operations to be identified.

Whether the operation of the hydraulic excavator 1 which operation is identified in step 231 and the determination condition determined in step 234 match each other is determined (step 236). When a result of the determination is NO, that is, when the operation of the hydraulic excavator 1 which operation is identified in step 231 and the determination condition determined in step 234 do not match each other, it is determined that work of work contents different from the work contents of the selected work mode is performed, and a work flag is set to False (step 237). The work flag (False) is output as an output of the work determining section 230 to the minimum alarm region determining section 240.

In addition, when the result of the determination in step 236 is YES, that is, when the operation of the hydraulic excavator 1 and the determination condition match each other, the work flag is set to True (step 236), and the work flag (True) is output as an output of the work determining section 230 to the minimum alarm region determining section 240.

In addition, when the result of the determination in step 233 is YES, that is, when the currently set work mode is the standard mode, the work flag is set to False (step 237), and the work flag (False) is output as an output of the work determining section 230 to the minimum alarm region determining section 240. Thus, when the work mode is the standard mode, it is difficult to estimate the operation of the hydraulic excavator, and the determination of whether work of work contents different from the work contents of the selected work mode is performed (work determination) is not necessary. The work flag is therefore set to False as in the case where it is determined that work of work contents different from the work contents of the selected work mode is performed.

Figure 8:
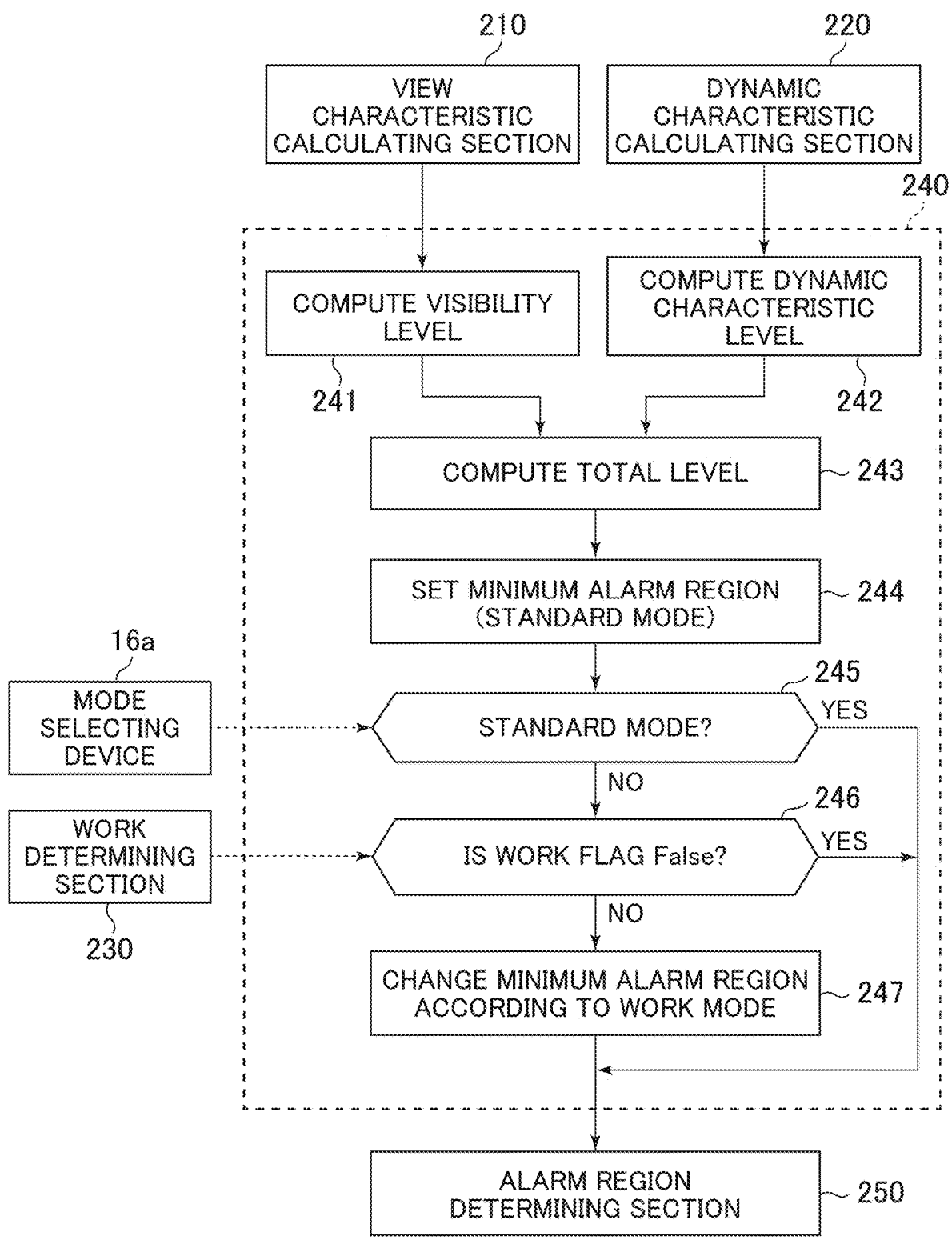
FIG. 8 is a diagram depicting a flow of processing of a minimum alarm region determining section.

FIG. 8 is a diagram depicting a flow of processing of the minimum alarm region determining section.

The minimum alarm region determining section 240 calculates a minimum alarm region set to the periphery of the hydraulic excavator 1 according to the calculation results of the view characteristic calculating section 210 and the dynamic characteristic calculating section 220, the determination result of the work determining section 230, the work mode selected by the mode selecting device 16a, and the like. The minimum alarm region is a region that is set for each of alarm regions corresponding to the respective work modes and which cannot be changed by the operator or the like as will be described later.

In FIG. 8, the minimum alarm region determining section 240 first computes a visibility level for a region on the periphery of the hydraulic excavator 1 on the basis of the view characteristic data of the hydraulic excavator 1 which is calculated by the view characteristic calculating section 210 (step 241). Here, the visibility level is an index indicating ease of viewing from the operator, and indicates that the higher the visibility level of a region is, the more easily the region is visible from the operator, and that the lower the visibility level of a region is, the less visible the region is from the operator. The view characteristic data is information on the respective regions of a direct view region, an indirect view region, and a blind spot region on the periphery of the hydraulic excavator 1. In step 241, a level 3 is determined (computed) as the visibility level for the direct view region, a level 2 is determined (computed) as the visibility level for the indirect view region, and a level 1 is determined (computed) as the visibility level for the blind spot region.

In addition, in parallel with the computation of the visibility level in step 241, a dynamic characteristic level of the hydraulic excavator 1 is computed on the basis of the dynamic characteristic data of the hydraulic excavator 1 which is calculated by the dynamic characteristic calculating section 220 (step 242). As described earlier, the dynamic characteristic data indicates the shortest collision predicted time in a region on the periphery of the hydraulic excavator 1. In step 241, the dynamic characteristic level is determined (computed) according to the length of the shortest collision predicted time.

Figure 9:
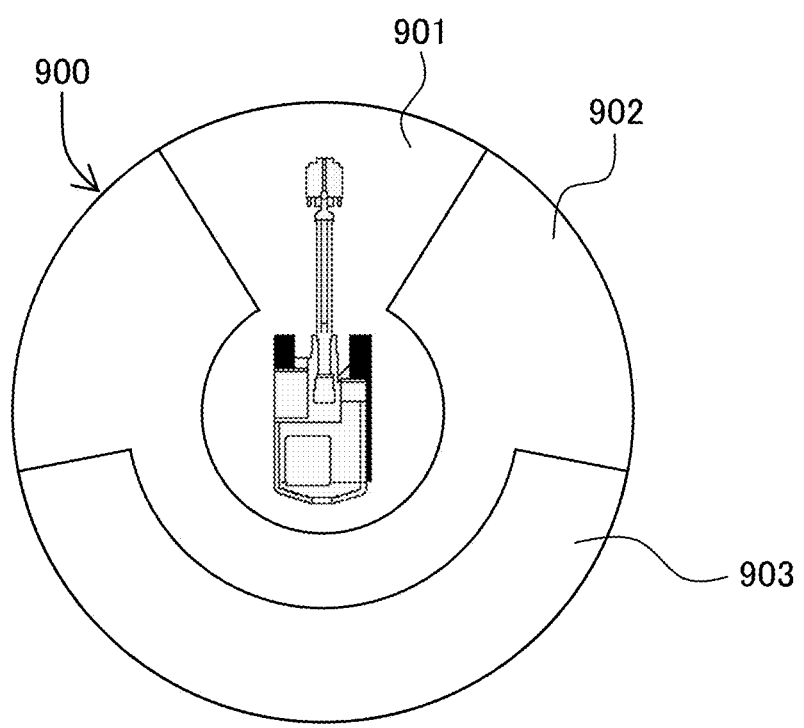
FIG. 9 is a diagram depicting an example of determination of a dynamic characteristic level for dynamic characteristic data.

FIG. 9 is a diagram depicting an example of determination of the dynamic characteristic level for the dynamic characteristic data.

In FIG. 9, in a region 900 on the periphery of the hydraulic excavator 1 to which the dynamic characteristic level is to be set, a level 1 is determined (computed) as the dynamic characteristic level for a region 901 in which a shortest collision time is 1 [s] or less, a level 2 is determined (computed) as the dynamic characteristic level for a region 902 in which the shortest collision time is 1 to 3 [s], and a level 3 is determined (computed) as the dynamic characteristic level for a region 903 in which the shortest collision time is 3 [s] or more.

Next, a total level is computed on the basis of the visibility level computed in step 241 and the dynamic characteristic level computed in step 242. Here, the total level is, for example, computed on the basis of a product of the visibility level and the dynamic characteristic level. A lower total level indicates a higher degree of necessity for alarming the operator about entering of an obstacle such as a worker or the like. In a case where the above-described computation method is used, when the visibility level of a region for which to compute the total level is the level 2, and the dynamic characteristic level of the region is the level 3, for example, the total level of the region is determined as a level 6.

It is to be noted that the methods of determining the respective levels of the visibility level, the dynamic characteristic level, and the total level are not limited to the example depicted in the foregoing, but can be changed as appropriate in consideration of factors such as the kind of the work machine to which the present invention is applied, the work environment of the work machine, and the like.

Next, according to the total level computed in step 243, the minimum alarm region in the case where the work mode is the standard mode is first read from the information storage section 261 of the storage section 260A, and is set (step 244). The lower the total level obtained on the basis of the product of the visibility level and the dynamic characteristic level, the less visible the region from the operator of the cab 1f and the shorter a time before collision, and therefore, the higher a degree of necessity for setting the region as the minimum alarm region. Incidentally, in the present embodiment, a region in which the total level is 1 is set as the minimum alarm region. However, the range of an additional alarm region (to be described later) that can be determined arbitrarily by the operator is determined by a threshold value setting here. Thus, operation with an arbitrary threshold value may be performed according to a judgment of a manager or the like.

Next, whether or not the present work mode is the standard mode is determined on the basis of a selection result of the mode selecting device 16a (step 245). In a case of a work mode other than the standard mode, whether work of work contents different from the work contents of the selected work mode is performed, that is, whether the work flag is False is checked on the basis of the determination result of the work determining section 230 (step 246). When the work flag is not False in step S246 (that is, when the work flag is True), that is, when work of the work contents of the selected work mode is performed, the minimum alarm region corresponding to the work mode is read from the information storage section 261 of the storage section 260A and is set (step 247), and the set minimum alarm region is output to the alarm region determining section 250.

The minimum alarm region is set in consideration of characteristics in each work mode. For example, in the MG mode, operation of the front work device 1A is mainly performed. Thus, a minimum alarm region is set for a region around the end position of the bucket 1c with the end position of the bucket 1c at a center, and a minimum alarm region in the rear of the machine body (vehicle main body 1B) is set narrower than in the standard mode in consideration of low frequency of travelling operation. Similarly, in the soil volume measuring mode, swing operation is mainly performed, and therefore, an operation is effective such that minimum alarm regions for the swing direction of the front work device 1A and the swing direction of a rear end of the vehicle main body 1B are expanded, and with decreases in travelling frequency and travelling distance, a minimum alarm region in the rear of the vehicle main body 1B is reduced. In addition, in the MG mode, the soil volume measuring mode, or the like, an operation is expected in which the operator operates while watching the monitor carefully. There is thus a fear that the operator may not notice the presence of an object even though a direct view is secured in the region. Therefore, in a work mode such as involves display on the monitor, an operation is effective such that a region nearest to the machine body (vehicle main body 1B) is set as a minimum alarm region irrespective of the presence or absence of a direct view.

In addition, when a result of the determination in step 245 is YES, that is, when the work mode is the standard mode, the minimum alarm region (standard mode) set in step 244 is output to the alarm region determining section 250.

In addition, when a result of the determination in step 246 is YES, that is, also when the work flag from the work determining section 230 is False and it is determined that work of work contents different from the work contents of the selected work mode is performed, the minimum alarm region (standard mode) set in step 244 is output to the alarm region determining section 250. That is, when work of work contents different from the work contents of the selected work mode is performed, it is difficult to estimate the operation of the hydraulic excavator 1 as the work machine, and therefore, the minimum alarm region at a time of the standard mode is applied.

Figure 10:
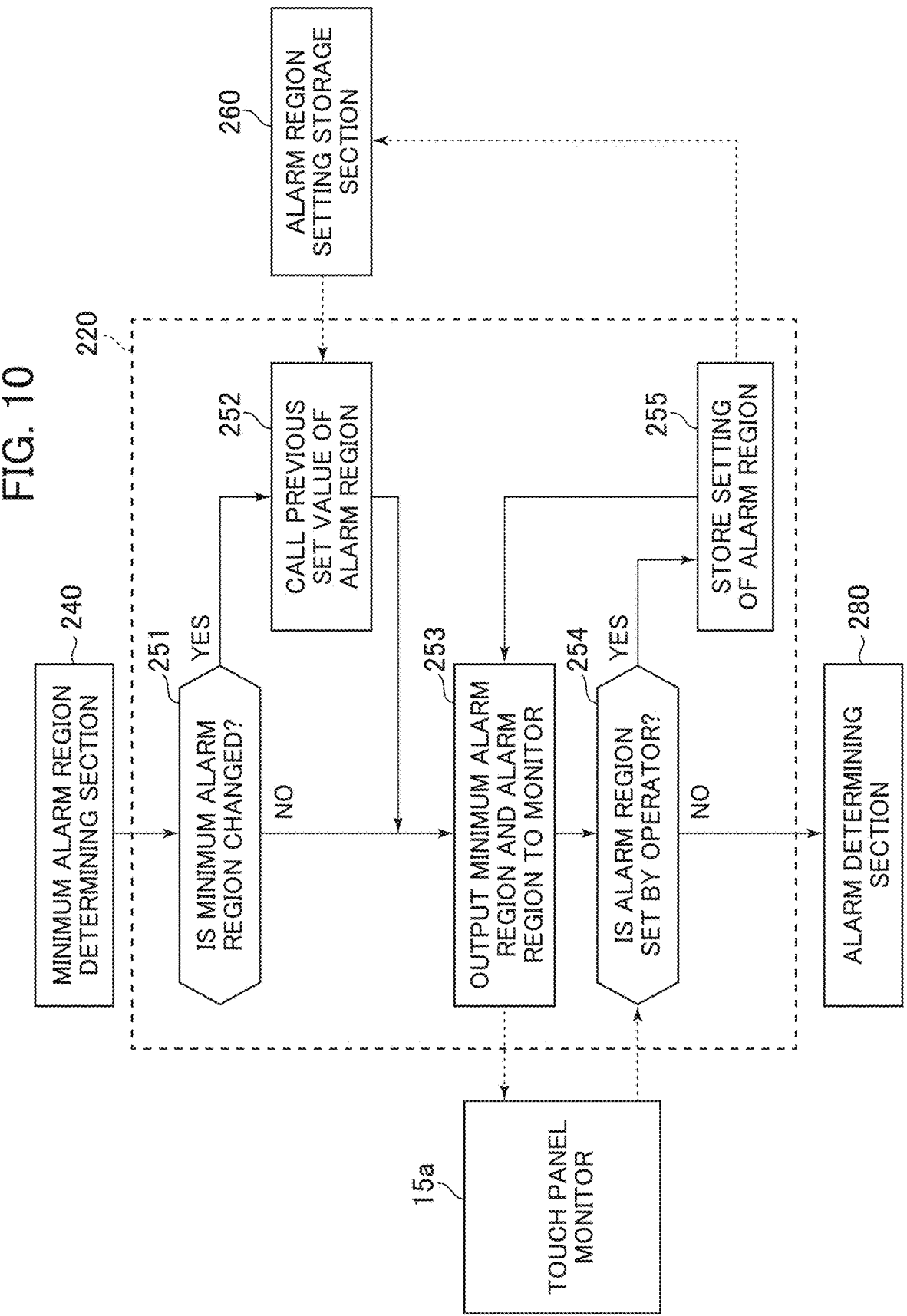
FIG. 10 is a diagram depicting a flow of processing of an alarm region determining section.

FIG. 10 is a diagram depicting a flow of processing of the alarm region determining section.

The alarm region determining section 250 calculates an alarm region set to the periphery of the hydraulic excavator 1 with respect to the minimum alarm region determined for the present work mode (the standard mode, the MG mode, the soil volume measuring mode, the work mode indicating work of work contents different from the work contents of the selected work mode (out-of-mode work), or the like) by the minimum alarm region determining section 240. The alarm region is a region combining the minimum alarm region set for each work mode and an additional alarm region set by the operator or the like for each work mode.

That is, when the work mode including work of work contents different from the work contents of the selected work mode is changed (that is, when the minimum alarm region is changed), the alarm region is changed according to the work mode. Incidentally, the present embodiment illustrates a case where the same minimum alarm region is used in the standard mode and in the case where work of work contents different from the work contents of the selected work mode is performed, as depicted in FIG. 8.

In FIG. 10, the alarm region determining section 250 first determines whether the minimum alarm region is changed (step 251). When a result of the determination is YES, a previous set value of the alarm region (additional alarm region) is read from the alarm region setting storage section 260 (step 252), and outputs the alarm region including the minimum alarm region from the minimum alarm region determining section 240 and the previous set value of the additional alarm region to the touch panel monitor 15a (step 253). In addition, when the result of the determination is NO, the minimum alarm region and the additional alarm region are output to the touch panel monitor 15a as they are (step 253).

Figure 11:
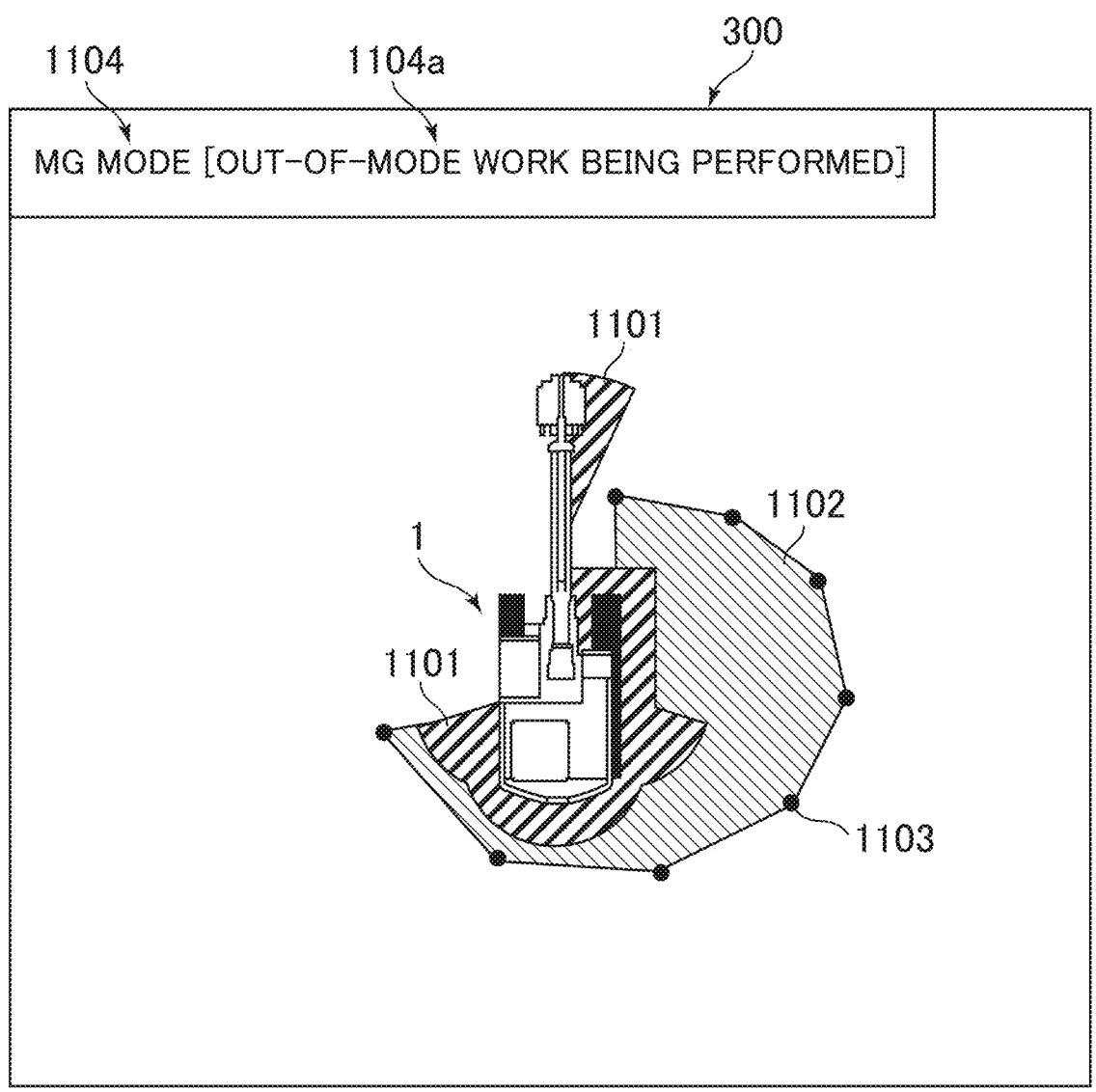
FIG. 11 is a diagram depicting an example of an alarm region displayed on a touch panel monitor.

FIG. 11 is a diagram depicting an example of the alarm region displayed on the touch panel monitor.

As depicted in FIG. 11, the touch panel monitor 15a displays a minimum alarm region 1101 and an arbitrarily set additional alarm region 1102 with the hydraulic excavator 1 as the work machine at a center. The operator sets the additional alarm region 1102 to an arbitrary range by performing addition or deletion of a variable point 1103 forming the additional alarm region 1102, changing of the position of a variable point 1103, or the like by touch operation. Incidentally, when work of work contents different from the work contents of the selected work mode is performed, a display 1104a for notifying that the alarm region is changed because the work of work contents different from the work contents of the selected work mode is performed by the operator is displayed in addition to a display 1104 notifying the currently set work mode.

Whether a setting is made to the alarm region output to the touch panel monitor 15a in step 253 by the operator, that is, whether a change in the additional alarm region is performed is determined (step 254). When a result of the determination is NO, the set alarm region (the minimum alarm region 1101 and the additional alarm region 1102) is output as a determination result of the alarm region determining section 250 to the alarm determining section 280.

In addition, when the result of the determination in step 254 is YES, that is, when the additional alarm region is changed, the setting of the alarm region (the minimum alarm region 1101 and the additional alarm region 1102 or only the additional alarm region 1102) is output to the alarm region setting storage section 260, and is stored as the previous set value (step 255). The alarm region is displayed on the touch panel monitor 15a again (step 253).

The alarm region setting storage section 260 stores the alarm region in each work mode set by the operator, and outputs the alarm region as the previous set value when the alarm range is switched by changing the work mode (including a transition to work of work contents different from the work contents of the selected work mode). When such processing is performed, the operator can reduce the trouble of setting the alarm range again each time the work mode is changed even under an environment in which the work mode is changed frequently.

The obstacle position calculating section 270 detects the presence of an obstacle such as a worker or the like through image processing and computes the position of the obstacle on the basis of two images obtained by each of the stereo cameras 13a to 13d. First, feature points are extracted from the images obtained by the stereo cameras 13a to 13d, and a worker is detected on the basis of learning data stored in advance. Next, the position of the obstacle such as the detected worker or the like in the images is converted into three-dimensional coordinates of a stereo camera coordinate system on the basis of a parallax image generated from the two images. The obstacle position calculating section 270 stores positions and angles at which the stereo cameras 13a to 13d are attached in the machine body coordinate system, and grasps the relative positions of the hydraulic excavator 1 and the worker by converting the position of the detected worker from the stereo camera coordinate system to the machine body coordinate system. Incidentally, while a mode of worker detection using the stereo cameras 13a to 13d has been illustrated in the present embodiment, it suffices to be able to measure the relative positions of the hydraulic excavator 1 as the work machine and the worker, and therefore, a configuration using LIDAR (Laser Imaging Detection and Ranging) or GNSS (Global Navigation Satellite System) may be adopted.

The alarm determining section 280 determines whether or not there is an obstacle such as a worker or the like within the alarm region on the basis of outputs from the alarm region determining section 250 and the obstacle position calculating section 270. When there is an obstacle, the alarm determining section 280 outputs an alarm signal to the alarming device (for example, the buzzer 15b).

Operation in the present embodiment configured as described above will be described.

Figure 12:
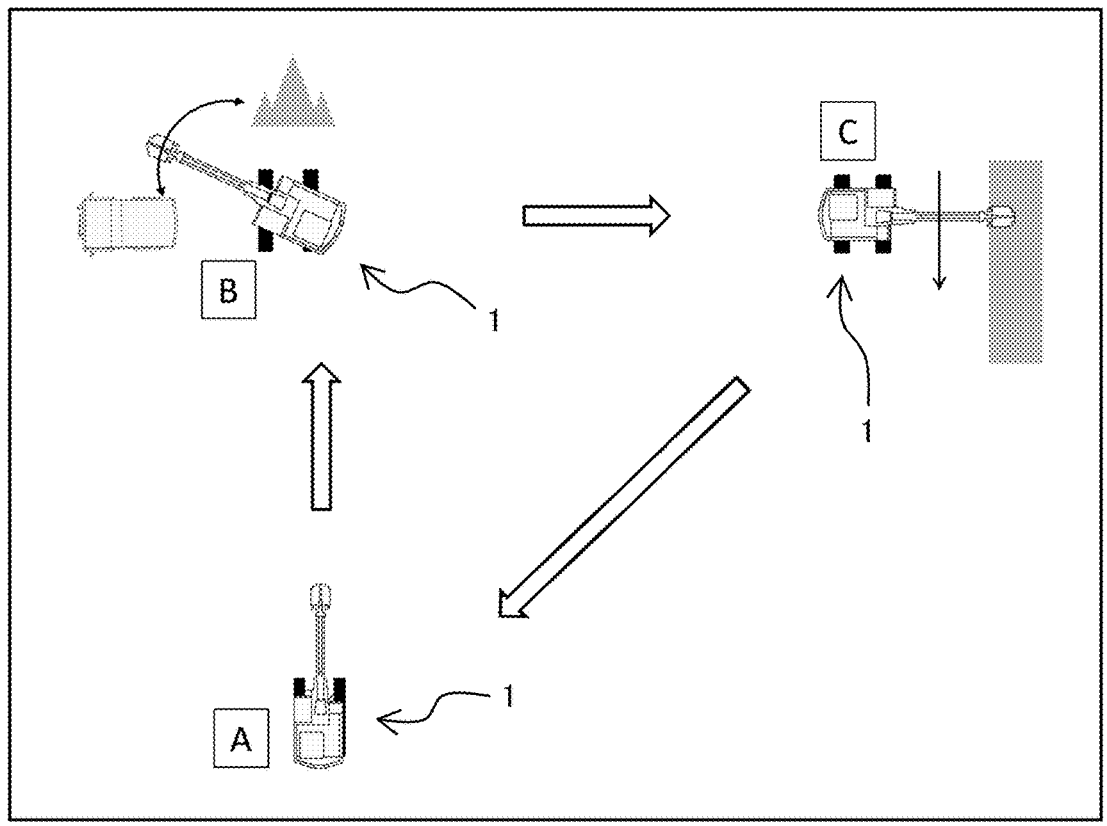
FIG. 12 is a diagram schematically depicting a relation between the hydraulic excavator 1 as the work machine and positions at which respective pieces of work are performed.

FIG. 12 is a diagram schematically depicting a relation between the hydraulic excavator 1 as the work machine and positions at which respective pieces of work are performed.

A series of work is assumed in FIG. 12, in which the hydraulic excavator 1 moves from a parking point A to a work point B at which excavation and loading work is to be performed, and performs the work, thereafter the hydraulic excavator 1 moves to a work point C at which to perform slope face shaping (leveling) work, and performs the work, and thereafter the hydraulic excavator 1 returns to the parking point A.

Figure 13:
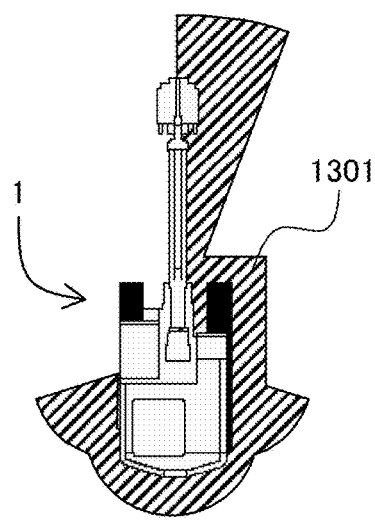
FIG. 13 is a diagram depicting an example of a minimum alarm region at a time of a standard mode.
Figure 14:
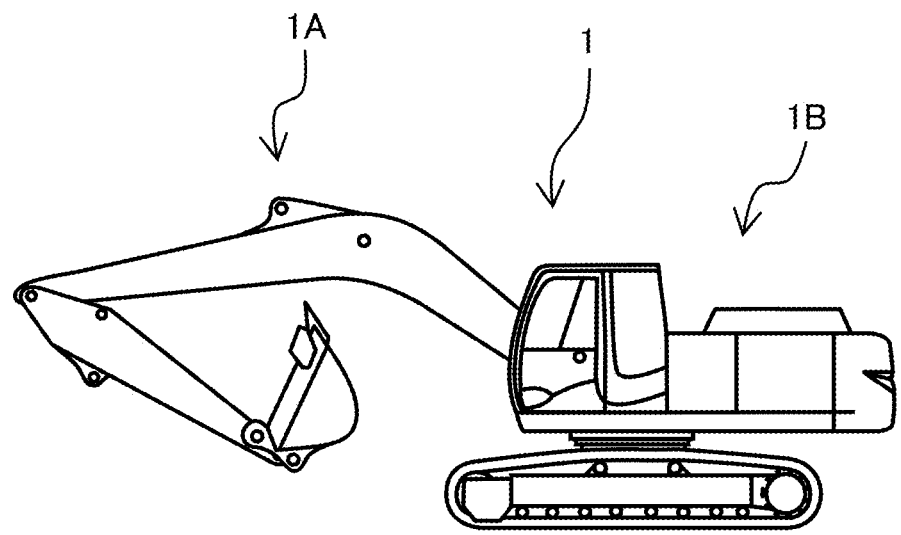
FIG. 14 is a side view depicting an example of a travelling posture.

In the movement from the parking point A to the work point B, travelling and the movement are performed in the standard mode. At this time, the hydraulic excavator 1 assumes a travelling posture as depicted in FIG. 14. At the time of the travelling posture, the right front of the hydraulic excavator 1 is a blind spot from the cab 1f, and therefore the region is automatically set as a minimum alarm region. At this time, the minimum alarm region is, for example, set as a minimum alarm region 1301 depicted in FIG. 13.

Figure 15:
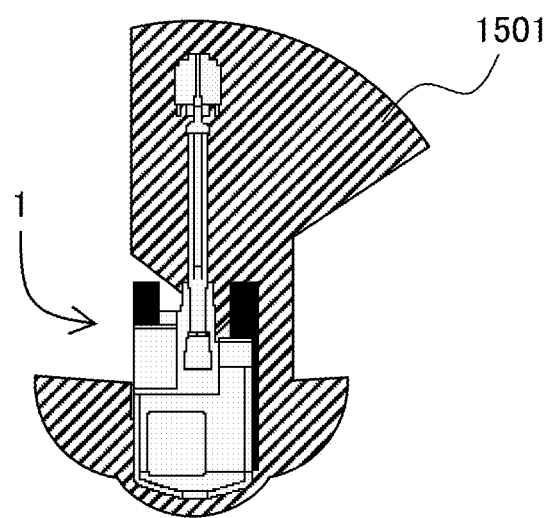
FIG. 15 is a diagram depicting an example of a minimum alarm region at a time of a soil volume measuring mode.

When the work mode is set to the soil volume measuring mode for the operator to perform excavation and loading operation after arriving at the work point B, a minimum alarm region suitable for the soil volume measuring mode is determined. FIG. 15 depicts an example of the minimum alarm region at the time of the soil volume measuring mode. FIG. 15 illustrates a case where a minimum alarm region 1501 is set. As described earlier, in the soil volume measuring mode, swing operation is mainly performed, and therefore, a hazardous region at a time of the swing operation is set as a minimum alarm region. Thus, the operator does not need to perform the alarm region setting himself/herself, and the trouble of setting operation can be reduced.

Here, in a case where the operator starts travelling operation while forgetting to switch the work mode when moving to the work point C after completing the work excavation and loading work at the work point B, the work flag is True, and therefore, the minimum alarm region is switched to the minimum alarm region similar to that at the time of the standard mode. Incidentally, for the alarm region, the previous set value is stored in the alarm region setting storage section 260. Thus, when the operator arbitrarily sets the alarm region (additional alarm region) at the time of the standard mode in advance, the alarm region setting at the time is reflected.

Figure 16:
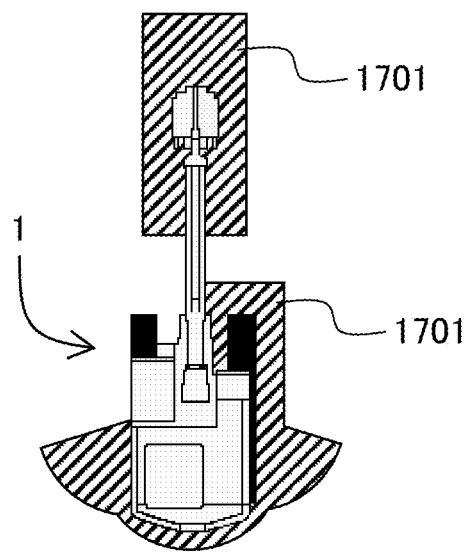
FIG. 16 is a diagram depicting an example of a minimum alarm region at a time of an MG mode.
Figure 17:
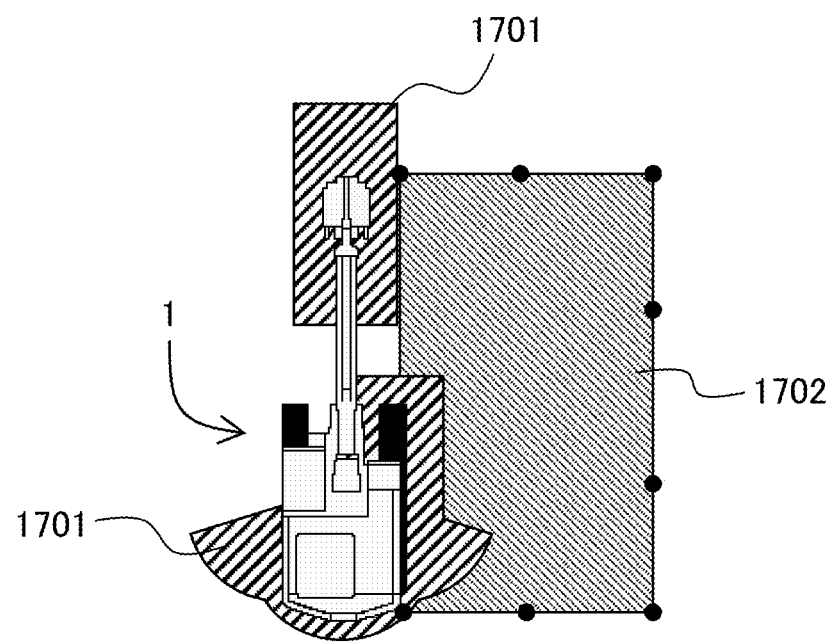
FIG. 17 is a diagram depicting an example of an additional alarm region at the time of the MG mode.

When the operator switches the work mode to the MG mode after arriving at the work point C, the minimum alarm region is automatically switched to a range suitable for the MG mode. FIG. 16 is a diagram depicting an example of the minimum alarm region at the time of the MG mode. In work in the work point C, leveling work is repeatedly performed while the work machine is moved in a right direction. Therefore, the operator sets a wide alarm region (that is, an additional alarm region) in the right direction as in FIG. 17, and performs the work. Thus, when the minimum alarm region alone is not sufficient in the setting of the alarm region in the planned work, the operator arbitrarily sets the additional alarm region, and performs the work.

After completing the work at the work point C, the operator switches the work mode to the standard mode, and performs travelling operation to the parking point A.

Thus, operation is performed such that the operator can set an alarm region suitable for basic work contents by only selecting the work mode, and sets an alarm region by arbitrarily setting an additional alarm region to a minimum alarm region only when determining that an alarm region of a wider range is necessary. It is therefore possible to reduce the trouble of settings made by the operator.

In the present embodiment configured as described above, a minimum alarm region is defined for each work mode, and is automatically switched to a minimum alarm region suitable for the work mode selected in the hydraulic excavator 1 as the work machine. It is therefore possible for the operator to reduce the trouble of setting the alarm region again for each piece of work.

Features of the present embodiment configured as described above will be summarized.

(1) In the foregoing, a hydraulic excavator 1 includes: a vehicle main body 1B; a front work device 1A (work device) attached to the vehicle main body 1B; pilot pressure sensors 9a and 9b (operation signal sensors) configured to detect an operation signal for driving the front work device 1A; an information processing controller 200 (control system) including an obstacle position calculating section 270 configured to detect an obstacle present on a periphery of the hydraulic excavator 1 (work machine) having the vehicle main body 1B and the front work device 1A, and compute a relative position of the detected obstacle relative to the hydraulic excavator 1; and a mode selecting device 16a configured to select a work mode of the hydraulic excavator 1; the information processing controller 200 including a work determining section 230 configured to determine whether work of work contents different from work contents of the work mode selected by the mode selecting device 16a is performed as work contents of the hydraulic excavator 1 on a basis of a detection result of the pilot pressure sensors 9a and 9b, a minimum alarm region determining section 240 configured to determine one of a plurality of minimum alarm regions preset on the periphery of the hydraulic excavator 1 on a basis of a selection result of the mode selecting device 16a and a determination result of the work determining section 230, and an alarm determining section 280 configured to output an alarm signal to a buzzer 15b (alarming device) when the relative position of the obstacle relative to the hydraulic excavator 1, the relative position being computed by the obstacle position calculating section 270, is inside an alarm region set so as to include the minimum alarm region determined by the minimum alarm region determining section 240.

Such a configuration suppresses an increase in a burden on the operator. It is thereby possible to suppress a decrease in work efficiency while performing appropriate control without an excess or an insufficiency with regard to an obstacle present on the periphery of the work machine.

(2) The work machine according to the above (1) includes an alarm region determining section 250 configured to allow an operator to determine, as the alarm region, an arbitrary region including the minimum alarm region determined by the minimum alarm region determining section 240.

Thus, the operator can arbitrarily set an additional alarm region when the minimum alarm region alone is not sufficient in the setting of the alarm region in planned work. Therefore, alarming in obstacle detection more suitable for work contents becomes possible.

(3) The work machine according to the above (2) includes an alarm region setting storage section 260 configured to store the alarm region determined by the alarm region determining section 250 for each minimum alarm region, in which the alarm region determining section 250 reads the alarm region from the alarm region setting storage section 260 on a basis of the minimum alarm region determined by the minimum alarm region determining section 240.

(4) The work machine according to the above (1) includes: angle sensors 8a and 8b (machine posture obtaining device) configured to obtain posture information of the hydraulic excavator 1; and a view characteristic calculating section 210 configured to calculate a view characteristic of an operator in the hydraulic excavator 1 on a basis of the posture information obtained by the angle sensors 8a and 8b; in which the minimum alarm region determining section 240 sets each of the plurality of minimum alarm regions on a basis of the view characteristic in the hydraulic excavator 1, the view characteristic being calculated by the view characteristic calculating section 210.

Thus, a more appropriate minimum alarm region can be set on the basis of the view of the operator and the work contents of the hydraulic excavator 1. Therefore, alarming in obstacle detection more suitable for the work contents becomes possible.

<Others>

It is to be noted that the present invention is not limited to the foregoing embodiments, but includes various modifications within a scope not departing from the spirit of the present invention. For example, the present invention is not limited to those including all of the configurations described in the foregoing embodiments, but also includes those from which a part of the configurations are omitted. In addition, a part of a configuration according to a certain embodiment can be added to or substituted for a configuration according to another embodiment.

In addition, while the foregoing description has been made by taking a hydraulic excavator as an example, the present invention is applicable to work machines (for example, a wheel loader and a crane) provided with a work device that may block the view of an operator from a cab.

In addition, a part or the whole of each of configurations related to the above-described information processing controller (control system) 200, functions of each of the configurations and execution processing, and the like may be implemented by hardware (for example, designing logic for performing each function by an integrated circuit or the like). In addition, the configurations related to the above-described information processing controller 200 may be a program (software) that implements functions related to the configurations of the information processing controller 200 by being read and executed by a calculation processing device (for example, a CPU). Information related to the program can be stored in, for example, a semiconductor memory (a flash memory, an SSD, or the like), a magnetic storage device (a hard disk drive or the like), a recording medium (a magnetic disk, an optical disk, or the like), and the like.

In addition, in the description of each of the foregoing embodiments, control lines and information lines construed as being necessary for the description of the embodiments are illustrated. However, not all of control lines and information lines of a product are necessarily illustrated. In actuality, almost all of configurations may be considered to be interconnected.

DESCRIPTION OF REFERENCE CHARACTERS

1: Hydraulic excavator
1*a*: Boom
1A: Front work device
1*b*: Arm
1B: Vehicle main body
1*c*: Bucket
1*d*: Upper swing structure
1*e*: Lower track structure
1*f*: Cab
3*a*: Boom cylinder
3*b*: Arm cylinder
3*c*: Bucket cylinder
3*e*: Travelling hydraulic motor
8*a* to 8*d*: Angle sensor
9*a* to 9*d*: Pilot pressure sensor
13*a* to 13*d*: Stereo camera
15*a*: Touch panel monitor
15*b*: Buzzer
16*a*: Mode selecting device
200: Information processing controller (control system)
210: View characteristic calculating section
211: Front device shape data
220: Dynamic characteristic calculating section
226: Basic characteristic data
230: Work determining section
240: Minimum alarm region determining section
250: Alarm region determining section
260: Alarm region setting storage section
260A: Storage section
261: Information storage section
270: Obstacle position calculating section
280: Alarm determining section
401: Direct view region
402: Indirect view region
403: Blind spot region
505: Basic dynamic characteristic data
900 to 903: Region
1101: Minimum alarm region
1102: Additional alarm region
1103: Variable point
1301, 1501: Minimum alarm region

The invention claimed is:

1. A work machine comprising:
a vehicle main body;
a work device attached to the vehicle main body;
an operation signal sensor configured to detect an operation signal for driving the work device;
a control system configured to detect an obstacle present on a periphery of the work machine having the vehicle main body and the work device, and compute a relative position of the detected obstacle relative to the work machine; and
a work mode selecting device configured to select a work mode according to work contents of the work machine,
wherein the control system is further configured to:
determine whether work of work contents different from work contents of the work mode selected by the work mode selecting device is performed as work contents of the work machine on a basis of the operation signal detected by the operation signal sensor and a determination condition set for each type of work mode,
select one of a plurality of minimum alarm regions preset on the periphery of the work machine on a basis of a selection result of the work mode selecting device and a determination result of the work contents,
output an alarm signal to an alarming device when the relative position of the obstacle relative to the work machine is inside an alarm region set so as to include the minimum alarm region, and
select and output the minimum alarm region corresponding to the work mode selected by the work mode selecting device in case that the work machine is performing the work contents of the work mode selected by the work mode selecting device, and select and output the minimum alarm region corresponding to a standard mode as the work mode to perform basic work in case that the work machine is performing a work different from the work contents of the work mode selected by the work mode selecting device.

2. The work machine according to claim 1, comprising:
an alarm region determining section configured to allow an operator to determine, as the alarm region, an arbitrary region including the minimum alarm region determined by the minimum alarm region determining section.

3. The work machine according to claim 2, comprising:
an alarm region setting storage section configured to store the alarm region determined by the alarm region determining section for each minimum alarm region,
wherein the alarm region determining section reads the alarm region from the alarm region setting storage section on a basis of the minimum alarm region determined by the minimum alarm region determining section.

4. The work machine according to claim 1, comprising:
a machine posture obtaining device configured to obtain posture information of the work machine; and
a view characteristic calculating section configured to calculate a view characteristic of an operator in the work machine on a basis of the posture information obtained by the machine posture obtaining device, wherein the minimum alarm region determining section sets each of the plurality of minimum alarm regions on a basis of the view characteristic in the work machine, the view characteristic being calculated by the view characteristic calculating section.

\* \* \* \* \*